United States Patent [19]

Baumann

[11] Patent Number: 4,516,220
[45] Date of Patent: May 7, 1985

[54] PULSE DEINTERLEAVING SIGNAL PROCESSOR AND METHOD

[75] Inventor: William J. Baumann, Scottsdale, Ariz.

[73] Assignee: Motorola, Inc., Schaumburg, Ill.

[21] Appl. No.: 404,004

[22] Filed: Aug. 2, 1982

[51] Int. Cl.³ ............................................. G06F 15/336
[52] U.S. Cl. ..................................... 364/715; 364/728
[58] Field of Search ............. 364/715, 728; 343/5 DP, 343/378; 382/29

[56] References Cited

U.S. PATENT DOCUMENTS

| | | | |
|---|---|---|---|
| 3,742,201 | 6/1973 | Groginsky | 364/727 |
| 3,789,145 | 1/1974 | Shah et al. | 370/22 |
| 3,803,405 | 4/1974 | Ohnsorge et al. | 370/4 |
| 3,859,515 | 1/1975 | Radcliffe, Jr. | 364/727 |
| 3,881,101 | 4/1975 | Pederson et al. | 364/728 |
| 3,956,619 | 5/1976 | Mundy et al. | 364/727 |
| 4,001,563 | 1/1977 | Bied-Charreton et al. | 364/727 |
| 4,001,564 | 1/1977 | Bied-Charreton et al. | 364/727 |
| 4,005,417 | 1/1977 | Collins | 343/17.2 PC |
| 4,025,920 | 5/1977 | Reitboeck et al. | 343/5 DP |
| 4,052,565 | 10/1977 | Baxter et al. | 179/1.5 S |
| 4,169,245 | 9/1979 | Crom et al. | 343/378 |
| 4,209,835 | 6/1980 | Guadagnolo | 364/715 |
| 4,227,175 | 10/1980 | Newman | 364/728 |

Primary Examiner—David H. Malzahn
Attorney, Agent, or Firm—Eugene A. Parsons

[57] ABSTRACT

The output video signal from a conventional, broadband receiver is supplied to a threshold detector and the received pulses having sufficient amplitude are sampled a plurality of times by a sample gate, converted to spectral signatures by Walsh transforms and placed in memory. The transformed data is correlated with spectral signatures from previous pulses to determine pulses from a common source. The spectral signature of different pulses are stored in target files and the time interval between pulses is calculated from the time of arrival of each pulse.

7 Claims, 4 Drawing Figures

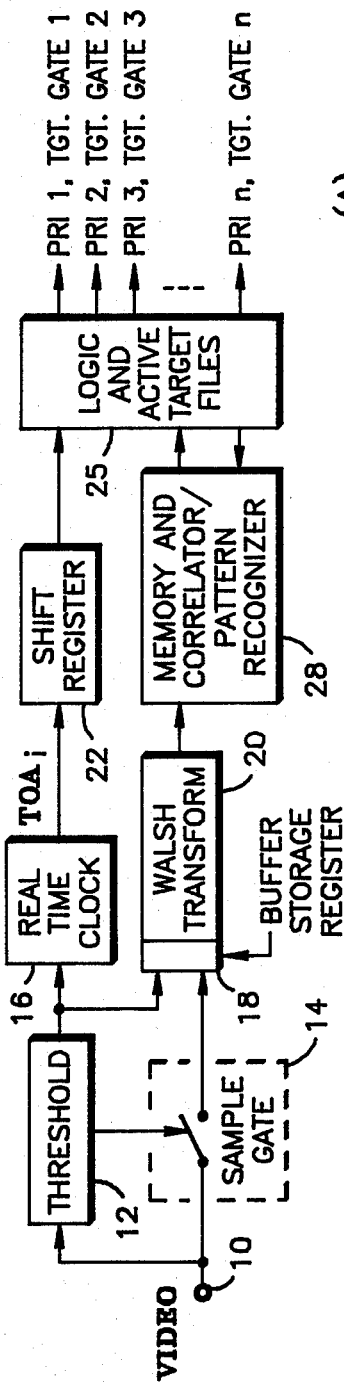
FIG. 1
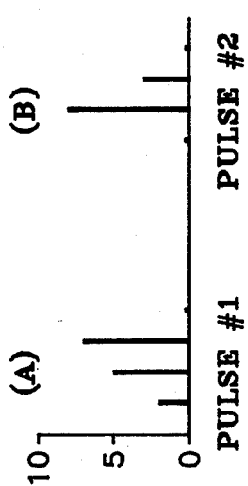
FIG. 4
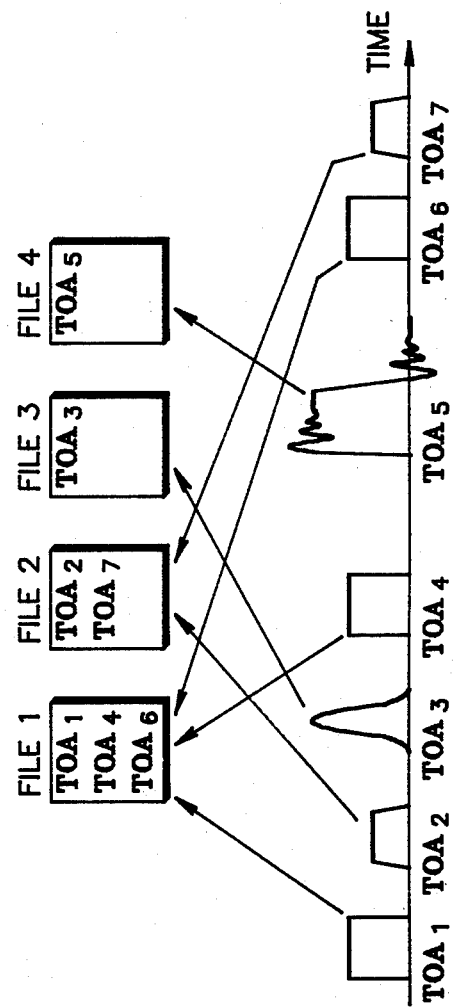
FIG. 2
FIG. 3

PULSE DEINTERLEAVING SIGNAL PROCESSOR AND METHOD

BACKGROUND OF THE INVENTION

The output video signal from a conventional, broadband receiver, such as may be used in an ECM system, various missiles, or intelligence collecting systems, is generally composed of multiple pulse signals from different radars which are in the passband of the receiver. The signal processor in these systems must separate the individual pulse signals, measure the pulse repetition interval (PRI) of pulses from a common source, and then synthesize a gate function which is time coincident with the PRI of interest in order to respond to the radar.

Existing systems for performing these functions use a variety of time domain techniques such as PRI filters, elaborate deinterleaving algorithms, and correlation with a reference waveform. Besides being extremely complicated and costly, many of these systems require apriori intelligence information concerning target characteristics which are pre-stored in the system.

SUMMARY OF THE INVENTION

The present invention pertains to a signal processor and method whereby the incoming pulses and the leading edge thereof are determined by some means, such as a threshold detector. The pulse is then sampled a plurality of times and the samples are converted to a plural point discrete transform to obtain an intrapulse spectral signature which is then stored in a memory and associated with the time of arrival of the pulse as measured by a real time clock at the instant the leading edge exceeds the threshold, which is also stored. Different spectral signatures, representing radar pulses from different sources, are stored in target files and each new spectral signature is compared with each of the different previously stored intrapulse spectral signatures to determine pulses which come from a common source. The time interval between pulses from a common source can then be determined easily.

It is an object of the present invention to provide a new and improved pulse deinterleaving signal processor.

It is a further object of the present invention to provide a pulse deinterleaving signal processor utilizing a standard transform, such as the Walsh transform, and a standard pattern recognition technique to provide a simplified processor and method which is relatively fast, inexpensive and accurate.

These and other objects of this invention will become apparent to those skilled in the art upon consideration of the accompanying specification, claims and drawings.

BRIEF DESCRIPTION OF THE DRAWINGS

Referring to the drawings

FIG. 1 is a simplified block diagram of a pulse deinterleaving signal processor embodying the present invention;

FIG. 2 illustrates a representative incoming pulse, which exceeds the threshold, sampled a plurality of times during the pulse;

FIG. 3 is a diagram of a typical chain of incoming pulses and the storage files therefor;

FIG. 4A and B illustrates typical spectral signatures for first and second received pulses, respectively.

DESCRIPTION OF THE PREFERRED EMBODIMENT

Referring specifically to FIG. 1, an input terminal 10 is adapted to receive the output video signal from a conventional, broadband receiver (not shown). The video signal from the terminal 10 is supplied to a threshold detector or threshold circuit 12 and to a sampling gate 14, which gate 14 is illustrated diagramatically. An output of the threshold circuit 12 is connected to an activating input of the sampling gate 14. An output of the threshold circuit 12 is also connected to a real-time clock 16 and to a buffer storage register 18 of a Walsh transform circuit 20. The threshold circuit 12 is utilized to select proper target pulses from surrounding interference, clutter, etc. and also activates the various circuits connected thereto at a specific predetermined point on the leading edge of the target pulse. It will of course be understood that other types of circuits might be utilized to select the proper target pulses from the video input signal but the threshold circuit 12 is illustrated because of its simplicity and reliability.

The output of the real-time clock 16 is supplied to a shift register 22 and the output thereof is connected to a block labeled logic and active target files 25. The output of the Walsh transform circuit 20 is connected to a memory and pattern recognizer or correlator 28, which is interconnected with the block 25. The block 25 typically includes logic and memory circuits, such as any of the well known minicomputers and random access memories. Typical Walsh transform circuits which might be utilized as the circuit 20 are described in detail in U.S. Pat. No. 3,742,201, entitled "Transformer System for Orthogonal Digital Waveforms", issued June 26, 1973; U.S. Pat. No. 3,859,515, entitled "Method and Apparatus for Signal Spectrum Analysis by Hadamard Transform", issued Jan. 7, 1975; U.S. Pat. No. 3,956,619, entitled "Pipeline Walsh-Hadamard Transformations", issued May 11, 1976; and U.S. Pat. No. 4,052,565, entitled "Walsh Function Signal Scrambler", issued Oct. 4, 1977. Since Walsh transform circuits are well known to those skilled in the art and the specific circuit is not a portion of the invention, additional disclosure of a circuit for block 20 will not be provided. It will of course be understood by those skilled in the art that a variety of plural point discrete transform circuits might be utilized in the block 20 to obtain a spectral signature and that the Walsh transformer is illustrated because Walsh transforms are very compact when the spectral analysis of pulses is involved. It is well known that Fourier transforms are convenient to use for the spectral analysis of sinusoidal type waveforms but are rather cumbersome in the spectral analysis of relatively square pulses, discrete signals and the like. Walsh transforms are very compact and, in fact, if the incoming pulse were a perfect square wave the Walsh transform would be a single line. Because the Walsh transforms are very compact the spectral signatures can be easily correlated between pulses to determine which pulses are emanating from a common source. It should be noted that Walsh transforms, Walsh-Hadamard transforms, and Hadamard transforms are very similar and completely interchangeable in systems such as the one being described and will be referred to under the general title of "Walsh Transforms".

The transformer 20 converts the plurality of samples of each input pulse into a spectrum, the title of which will vary in accordance with the type of transform utilized (e.g. Hadamard spectrum, sequency spectrum, etc.), and which will be referred to herein as the spectral signature of each pulse. The spectral signature of each pulse from a different source varies substantially because of the various pulse shapes which are different for each radar due to intentional modulation differences such as pulse width and PRI and unintentional differences due to propagation effects, transmitter irregularities and non-linearities, frequency synthesizer stability, system impedance mismatch, etc. Thus, pulses from a common source can be compared and recognized while pulses from different sources can be compared and separated due to their substantially different intrapulse spectral signatures.

In the operation of the system disclosed, the first pulse received is passed through the threshold circuit 12 and sampled in gate 14 simultaneously, assuming the amplitude meets the threshold criterion (see FIG. 2). A time reference from the real-time clock 16 is loaded into the shift register 22. Meanwhile, the samples from the gate 14 are transformed in block 20 into a spectral signature which is applied to the memory and correlator 28. Since no previous pulses have been received there is no correlation and the spectral signature is supplied to a first active target file in the block 25. Typical incoming pulses and the target files are illustrated in FIG. 3.

A second pulse is applied to the terminal 10 and is operated upon exactly as described above. In addition, when the spectral signature of the second pulse is in the memory and correlator 28, the spectral signature of the second pulse is correlated with the spectral signature of the first pulse. The correlation may be any of the well known pattern recognition techniques, for example, the minimum distance, or nearest neighbor, technique, or any of the other pattern recognition techniques described in the literature. See for example, *Introduction to Mathematical Techniques in Pattern Recognition*, by Harry C. Andrews, published by Wiley-Interscience, a division of John Wiley & Sons, Inc., copyright 1972. A typical correlator for comparing spectral signatures is illustrated in detail in the above cited U.S. Pat. No. 3,742,201, and will not be described in detail herein. However, for a better understanding of the spectral signatures and the correlation thereof a simplified example of the correlation is set forth below.

In FIG. 4A and B, typical four point transform, spectral signatures are illustrated for the first and second pulses in the composite signal. In this simplified example the four amplitudes of the points of the first pulse are 2, 5, 7, 0 and the amplitudes of the four points of the second pulse are 0, 8, 3, 0. It will of course be understood that four points are illustrated for simplicity of explanation and any number of samples, N, may be taken where $N=2^k$, $k=1, 2, 3$, etc. In the minimum distance recognition technique, two spectral signatures are correlated by subtracting the amplitude of similar points and combined to obtain a distance measure of the similarity of the two patterns. In the above example the first point of the second pulse is subtracted from the first point of the first pulse to give a 2; the second point of the second pulse is subtracted from the second point of the first pulse to give a $-3$; the third point of the second pulse is subtracted from the third point of the first pulse to give a 4; and the fourth point of the second pulse is subtracted from the fourth point of the first pulse to give a 0. The data is then combined in some fashion to obtain a distance measure, for example by taking the square root of the sum of the squares. In the above example, the final result would be the square root of 29.

Since the spectral signature of pulses even from a common source will vary to some extent because of interference, variations in the source, etc., it is necessary to assume that spectral signatures which come within a predetermined minimum value are not substantially different and, therefore, emanate from a common source. The measure of the similarity of the two spectral signatures or patterns is the distance which is least. Thus, once the data is combined as described above, it is compared to a threshold or minimum value criteria and if it falls within the minimum value criteria it is assumed to emanate from a common source. Since the two spectral signatures described above are substantially different the spectral signatures do not compare and the second pulse is placed in a second active target file in block 25.

In a similar fashion a third pulse (see FIG. 3) enters the system and the spectral signature thereof is compared to the spectral signature of the first two pulses, which spectral signatures are now stored in the target files 25. Since the third pulse differs substantially from the first two pulses, the spectral signatures will differ and subsequent to the correlation in block 28 the spectral signature of the third pulse will be moved into a third target file in block 25.

The fourth pulse applied to the input terminal 10 is transformed to a spectral signature and compared to each of the first three pulses as previously described. It can be seen from FIG. 3, that the fourth pulse is similar to the first pulse and this fact will be determined by the correlator 28. The time of arrival of the fourth pulse, as stored in the shift register 22, will be shifted into the first target file so that the time interval between the first and fourth pulses can be determined in the logic and target files 25. Thus, the system separates the composite video signal applied to input terminal 10 into individual pulse signals in time, identifies the PRI of each of the signals and synthesizes target gates for PRI tracking and the like. The PRI and synthesized gates are available at the various outputs of the block 25. In most instances, the PRI will not be derived by simply receiving two pulses but will only be confirmed after a predetermined number of pulses are received from the same source (based on probability of detection criteria). In general the PRI will be obtained by subtracting the times of arrival in an individual target file and averaging the differences. This could be a continuous procedure with the PRI being constantly updated for whatever period of time of available.

Thus, an improved signal processor for pulse deinterleaving, PRI identification and pulse tracking is disclosed which is simple in concept, utilizes digital hardware, uses a transform which is efficient for pulse signal analysis, and provides faster separation and identification of signals. This invention provides a faster (near real time) analysis and separation of a composite pulse video signal than existing systems and fewer pulses are required for identification because of the use of the Walsh transform technique and the minimum distance classifier. Further, the real-time clock allows a more accurate PRI measurement to be made. This invention does not require apriori intelligence information concerning target characteristic and, therefore, is flexible and more responsive to different target characteristics.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of this invention.

I claim:

1. A pulse deinterleaving signal processor comprising:

an amplitude threshold circuit providing an output signal in response to the application thereto of each input pulse exceeding a predetermined threshold;

a timing circuit connected to receive the output signals from said threshold circuit and provide a time of arrival signal at an output thereof in response to each output signal received from said threshold circuit;

a sampling device connected to receive the input pulses and provide a plurality of samples of each pulse exceeding the predetermined threshold in response to an output signal from said threshold circuit;

a transform circuit connected to receive the plurality of samples from said sampling device and provide a plural point transform, spectral signature of each sampled pulse at an output thereof;

a memory coupled to the output of said transform circuit for receiving and storing each substantially different spectral signature;

a pattern recognizer/correlator connected to receive each spectral signature from said transform circuit and connected to said memory for comparing each received spectral signature with each stored spectral signature to determine pulses from a common source; and logic circuitry coupled to said correlator and said timing circuit for determining the time interval between pulses from a common source.

2. A processor as claimed in claim 1 wherein the transform circuit includes apparatus for converting the plurality of samples to Walsh transforms.

3. A processor as claimed in claim 2 wherein the correlator includes apparatus utilizing a minimum distance pattern recognition technique.

4. A pulse deinterleaving method comprising the steps of:

selecting desired pulses from input signals including interference;

determining and storing the time of arrival of each selected pulse;

sampling each selected pulse a plurality of times;

transforming the plurality of samples of each selected pulse into a plural point transform, spectral signature for the selected pulse;

correlating the spectral signature for each selected pulse with stored spectral signatures to determine selected pulses from a common source;

storing the spectral signature for each selected pulse which is substantially different than previous selected pulses; and determining the time interval between selected pulses from a common source from the stored time of arrival of each selected pulse.

5. A pulse deinterleaving method as claimed in claim 4 wherein the step of selecting desired pulses includes selecting input pulses which exceed a predetermined threshold.

6. A pulse deinterleaving method as claimed in claim 4 wherein the step of transforming the plurality of samples includes transforming the plurality of samples of each selected pulse into a plural point discrete Walsh transform, spectral signature.

7. A pulse deinterleaving method as claimed in claim 6 wherein the step of correlating the spectral signature includes using a minimum distance pattern recognition technique.

* * * * *